Patented Dec. 17, 1940

2,225,392

UNITED STATES PATENT OFFICE 2,225,392

WAXING AND POLISHING COMPOSITION

William O. Pool and James Harwood, Chicago, Ill., assignors to Armour and Company, Chicago, Ill., a corporation of Illinois No Drawing. Application February 12, 1940,
Serial No. 318,558

12 Claims. (Cl. 134—24)

This invention relates to waxing and polishing compositions and it comprises solid or liquid compositions which contain high molecular weight phthalimides of the general formula

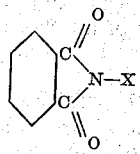

wherein X is a straight chain hydrocarbon radical having six or more carbon atoms.

Most of the ordinary waxing and polishing compositions are composed of solid vegetable or animal waxes in a liquid vehicle. The waxes usually used are carnauba, beeswax, spermaceti, and montan wax. These animal and vegetable waxes are generally esters of high molecular weight fatty acids such as myricyl palmitate. For example, carnauba wax is mostly myricyl cerotate, spermaceti is mostly cetyl palmitate, and beeswax is composed of a mixture of cerotic acid and myricyl palmitate. Most of the naturally occurring waxes are mixtures of these various alkyl esters and many of their properties are due to the fact that they occur as mixtures and not as pure compounds.

These naturally occurring waxes are useful because of their physical properties such as a very amorphous nature, relative inertness, and ability to take a high polish when rubbed. In the commercial preparation of waxing and polishing compositions it is customary to either dissolve these waxes in a liquid vehicle or to incorporate them in paste-like substances so that they may be spread evenly over the surface to be polished. These waxes differ somewhat in their physical characteristics. Some of them, such as carnauba, are extremely hard and give hard surfaces which cannot be easily scratched. Other waxes are characterized by their high melting point whereas still others are distinguished by their ability to take a high polish. In some cases it is desirable to mix several waxes in order to prepare a waxing or polishing composition having the desirable properties of the individual waxes.

The naturally occurring waxes possess some disadvantages and the tendency is now to prepare synthetic chemicals possessing wax-like properties which can be used as substitutes for the naturally occurring waxes. One marked disadvantages of the naturally occurring waxes is that they are all esters and, consequently, are not entirely inert chemically. All of them undergo hydrolysis to a certain extent and this fact probably accounts for their loss of brilliancy after a short period of time.

We have made a study of a number of synthetic compounds possessing wax-like properties with the view to using such compounds as substitutes for the naturally occurring waxes. During the course of this study we have synthesized a large number of compounds and tested their usefulness for this purpose. As a result of our experiments, we have discovered that the high molecular weight phthalimides containing long-chain alkyl radicals are hard wax-like compounds which give an extremely high luster when polished and we have discovered that such phthalimides when dissolved in a suitable solvent make an excellent waxing and polishing composition. When this composition is applied to a wooden surface it has a cleaning effect and also gives a high luster to the surface, which luster is quite permanent and not easily marred.

The phthalimides used in the present invention can be prepared by heating 1 mol. of phthalic anhydride with 1 mol. of a primary aliphatic amine having at least six carbon atoms until the evolution of water ceases. For example, N-dodecylphthalimide is prepared as follows: 1 mol. (185 grams) of dodecylamine and 1 mol. (148 grams) of phthalic anhydride are mixed in an open flask and then heated to 165° C. for a period of four hours. Evolution of water ceases after this heating period. The product, N-dodecylphthalimide, is poured into molds and allowed to solidify. It is a medium hard, light-colored wax. These high alkyl phthalimides have melting points which vary with the length of the alkyl group. For example, N-dodecylphthalimide melts at 65–67° C., N-octadecylphthalimide melts at 80–81° C., and the phthalimide which is a mixture of N-tetradecyl-, hexadecyl-, and octadecylphthalimide has a melting point of 55–57° C.

As stated above, these phthalimides possess high waxing and polishing properties and superior waxing or polishing compositions can be prepared from them. Generally, in preparing these waxing and polishing compositions, we dissolve the phthalimides in a solvent such as carbon tetrachloride, alcohols, oils, etc. or they can be used in the form of an emulsion.

We shall now give various examples of ways of illustrating our invention.

To prepare a polish we dissolve one part of N-octadecylphthalimide in one part of warm benzene. On cooling, this sets to a wax-like consistency which can be easily rubbed or polished over surfaces. A liquid wax composition may be prepared by increasing the amount of solvent. Instead of using N-dodecylphthalimide we can use any phthalimide in which the -N hydrogen is substituted by an alkyl radical having at least six carbon atoms. Or we can use mixtures of such high molecular weight phthalimides. All of these various compositions possess the property of imparting a high polish to surfaces when applied thereto and rubbed, and this property is in every case dependent upon the presence of the phthalimides in the mixture.

As stated, we can prepare aqueous emulsions of our phthalimides and the emulsions can be either semi-solid paste-like products or flowable liquids. Thus, for example, we can emulsify two parts by weight of N-octadecylphthalimide and three parts by weight of water using a soap such as sodium oleate as the emulsifying agent. This results in a paste which has superior waxing and polishing properties.

We have referred more specifically to N-alkyl-substituted phthalimides in which the alkyl group has from twelve to eighteen carbon atoms. The primary amines of from twelve to eighteen carbon atoms are more readily obtained than those having from six to ten, but we can use N-hexylphthalimide, N-octylphthalimide, and N-decylphthalimide.

Although we have referred more specifically to the use of these phthalimides as the major wax constituent in our compositions, we can, of course, admix our phthalimides with other kinds of polishing waxes; for example, we can prepare a wax composed of equal parts of N-dodecylphthalimide and carnauba wax and then emulsify this mixture or incorporate it into a solvent. Other waxes such as beeswax or montan wax can, of course, be substituted for the carnauba wax.

Having thus described our invention, what we claim is:

1. A waxing and polishing composition containing, as a waxing constituent, an N-alkyl phthalimide in which the alkyl group contains at least six carbon atoms.

2. A waxing and polishing composition containing as a waxing constituent, an N-alkyl phthalimide in which the alkyl group contains at least twelve carbon atoms.

3. A waxing and polishing composition containing N-dodecylphthalimide.

4. A waxing and polishing composition comprising a solution of an N-alkyl phthalimide in which the alkyl group contains at least six carbon atoms.

5. A waxing and polishing composition comprising a solution of an N-alkyl phthalimide in which the alkyl group contains at least twelve carbon atoms.

6. A waxing and polishing composition comprising a solution of N-dodecylphthalimide.

7. A waxing and polishing composition comprising an emulsion of an N-alkyl phthalimide in which the alkyl group contains at least six carbon atoms.

8. A waxing and polishing composition comprising an emulsion of an N-alkyl phthalimide in which the alkyl group contains at least twelve carbon atoms.

9. A waxing and polishing compsition comprising an emulsion of N-dodecylphthalimide.

10. A waxing and polishing composition comprising a paste containing an N-alkyl phthalimide in which the alkyl group contains at least six carbon atoms.

11. A waxing and polishing composition comprising a paste containing an N-alkyl phthalimide in which the alkyl group contains at least twelve carbon atoms.

12. A waxing and polishing composition comprising a paste containing N-dodecylphthalimide.

WILLIAM O. POOL.
JAMES HARWOOD.